United States Patent
McFarland et al.

(10) Patent No.: US 10,507,861 B2
(45) Date of Patent: Dec. 17, 2019

(54) ADJUSTABLE STEERING COLUMN LOCK

(71) Applicant: Robert Bosch Automotive Steering LLC, Northville, MI (US)

(72) Inventors: Michael McFarland, Maineville, OH (US); Olivier Perichon, Independence, KY (US)

(73) Assignee: ROBERT BOSCH AUTOMOTIVE STEERING LLC, Northville, MI (US)

( * ) Notice: Subject to any disclaimer, the term of this patent is extended or adjusted under 35 U.S.C. 154(b) by 0 days.

(21) Appl. No.: 15/569,006

(22) PCT Filed: Apr. 21, 2016

(86) PCT No.: PCT/US2016/028536
§ 371 (c)(1),
(2) Date: Oct. 24, 2017

(87) PCT Pub. No.: WO2016/172276
PCT Pub. Date: Oct. 27, 2016

(65) Prior Publication Data
US 2018/0127018 A1 May 10, 2018

Related U.S. Application Data

(60) Provisional application No. 62/152,096, filed on Apr. 24, 2015.

(51) Int. Cl.
*B62D 1/184* (2006.01)
*B62D 1/187* (2006.01)

(52) U.S. Cl.
CPC ............ *B62D 1/184* (2013.01); *B62D 1/187* (2013.01)

(58) Field of Classification Search
CPC .................. B62D 1/184; B62D 1/187
See application file for complete search history.

(56) References Cited

U.S. PATENT DOCUMENTS 5,722,299 A * 3/1998 Yamamoto ............ B62D 1/184
280/775
5,743,150 A * 4/1998 Fevre .................... B62D 1/184
280/775
(Continued)

FOREIGN PATENT DOCUMENTS

CN          102149504 A      8/2011
DE       102012104055 A1    11/2013
(Continued)

OTHER PUBLICATIONS

International Search Report and Written Opinion for Application No. PCT/US2016/028536 dated Jul. 15, 2016, (6 pages).
(Continued)

*Primary Examiner* — Paul N Dickson
*Assistant Examiner* — Timothy Wilhelm
(74) *Attorney, Agent, or Firm* — Michael Best & Friedrich LLP

(57) ABSTRACT

The invention is directed to a lock for an adjustable steering column. The lock has a first member having at least one tooth disposed in a first direction. The lock has a second member having at least one tooth disposed in a second direction. A moveable locking device having a first recess disposed to engage at least one tooth on the first member and a second recess positioned to engage the at least one tooth on the second member. A releasable clamping device is positioned to be moved into and away from an engagement position with the first and second members. The first recess restricting movement in the first direction and the second recess restricting movement in the second direction when the moveable locking device is engaged with the first and second members.

6 Claims, 5 Drawing Sheets

(56) References Cited

U.S. PATENT DOCUMENTS

| | | | | |
|---|---|---|---|---|
| 6,092,957 | A * | 7/2000 | Fevre | B62D 1/184 280/775 |
| 6,390,717 | B1 * | 5/2002 | Bar | B62D 1/184 280/775 |
| 6,419,269 | B1 * | 7/2002 | Manwaring | B62D 1/184 280/775 |
| 6,616,185 | B2 | 9/2003 | Manwaring et al. | |
| 7,484,430 | B2 * | 2/2009 | Schulz | B62D 1/184 280/777 |
| 7,635,149 | B2 * | 12/2009 | Menjak | B62D 1/184 280/775 |
| 7,685,903 | B2 * | 3/2010 | Streng | B62D 1/184 74/492 |
| 7,752,940 | B2 * | 7/2010 | Lutz | B62D 1/184 280/775 |
| 7,861,615 | B2 * | 1/2011 | Harris | B62D 1/187 280/775 |
| 8,006,587 | B2 * | 8/2011 | Schnitzer | B62D 1/184 74/493 |
| 8,327,733 | B2 * | 12/2012 | Ozsoylu | B62D 1/184 280/775 |
| 8,413,541 | B2 * | 4/2013 | Davies | B62D 1/184 280/777 |
| 8,474,869 | B2 * | 7/2013 | Sulser | B62D 1/184 280/775 |
| 8,671,795 | B2 * | 3/2014 | Ozsoylu | B62D 1/184 74/493 |
| 8,827,311 | B2 * | 9/2014 | Schnitzer | B62D 1/184 188/371 |
| 9,187,116 | B2 * | 11/2015 | Yokota | B62D 1/192 |
| 9,446,781 | B2 * | 9/2016 | Tanaka | B62D 1/187 |
| 9,469,330 | B2 * | 10/2016 | Tanaka | B62D 1/184 |
| 9,604,663 | B2 * | 3/2017 | Tomiyama | B62D 1/184 |
| 10,005,485 | B2 * | 6/2018 | Kurz | B62D 1/184 |
| 2004/0035238 | A1 * | 2/2004 | Jolley | B62D 1/184 74/493 |
| 2004/0261565 | A1 * | 12/2004 | Uphaus | B62D 1/184 74/493 |
| 2008/0178702 | A1 * | 7/2008 | Lutz | B62D 1/184 74/493 |
| 2010/0275721 | A1 * | 11/2010 | Davies | B62D 1/184 74/493 |
| 2011/0041642 | A1 * | 2/2011 | Havlicek | B62D 1/184 74/493 |
| 2013/0174684 | A1 | 7/2013 | Burns | |

FOREIGN PATENT DOCUMENTS

| | | |
|---|---|---|
| FR | 2768203 A1 | 3/1999 |
| FR | 2768204 A1 | 3/1999 |
| KR | 20160050315 A | 5/2016 |

OTHER PUBLICATIONS

Extended European Search Report from the European Patent Office for Application No. 16783815.0 dated Sep. 25, 2018 (10 pages).
Office Action from the State Intellectual Property Office of the People's Republic of China for Application No. 201680023466.0 dated Jun. 21, 2019 (7 pages).

* cited by examiner

ADJUSTABLE STEERING COLUMN LOCK

CROSS-REFERENCE TO RELATED APPLICATION

The present patent application is based upon and claims the benefit of provisional patent application No. 62/152,096, filed on Apr. 24, 2015.

BACKGROUND OF THE INVENTION

The present invention is directed to an adjustable steering column for use in vehicles. The steering column is designed to be adjusted in a tilt direction by the operator of the vehicle. The motion in a tilt direction is essentially an upwardly or downwardly motion with respect of the operator of the vehicle. The tilt motion is substantially perpendicular to the longitudinal axis of the vehicle.

In prior art adjustable steering columns, the locking mechanisms that retain the steering column in position after the adjustments have been made have not always provided a desired level of resistance to movement for the steering column. Most of the prior art adjustable steering columns have had a locking mechanism that is designed to prevent a level of security against movement in one direction, but a much lower level of security when the motion is in the opposite direction for the tilting of the steering column. With advances in the safety provided for the operator of a vehicle it is has been determined that an adjustable tilt steering column that has strong resistance to movement in both an upwardly and downwardly direction can provide additional safety benefits. It has also been found that increasing the strength of the locking mechanism can provide additional safety benefits for the operator. It is also important that the increases in the locking forces be accomplished without requiring significant weight penalties or significant additional complexities in the adjustment mechanism for the steering column.

SUMMARY OF THE INVENTION

The invention is directed to a lock for an adjustable steering column. The lock has a first member having at least one tooth disposed in a first direction. The lock has a second member having at least one tooth disposed in a second direction. A moveable locking device has a first recess disposed to engage at least one tooth on the first member and a second recess positioned to engage the at least one tooth on the second member. A releasable clamping device is positioned to be moved into and away from an engagement position with the first and second members. The first recess restricting movement in the first direction and the second recess restricting movement in the second direction when the moveable locking device is engaged with the first and second members.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Figure 1:
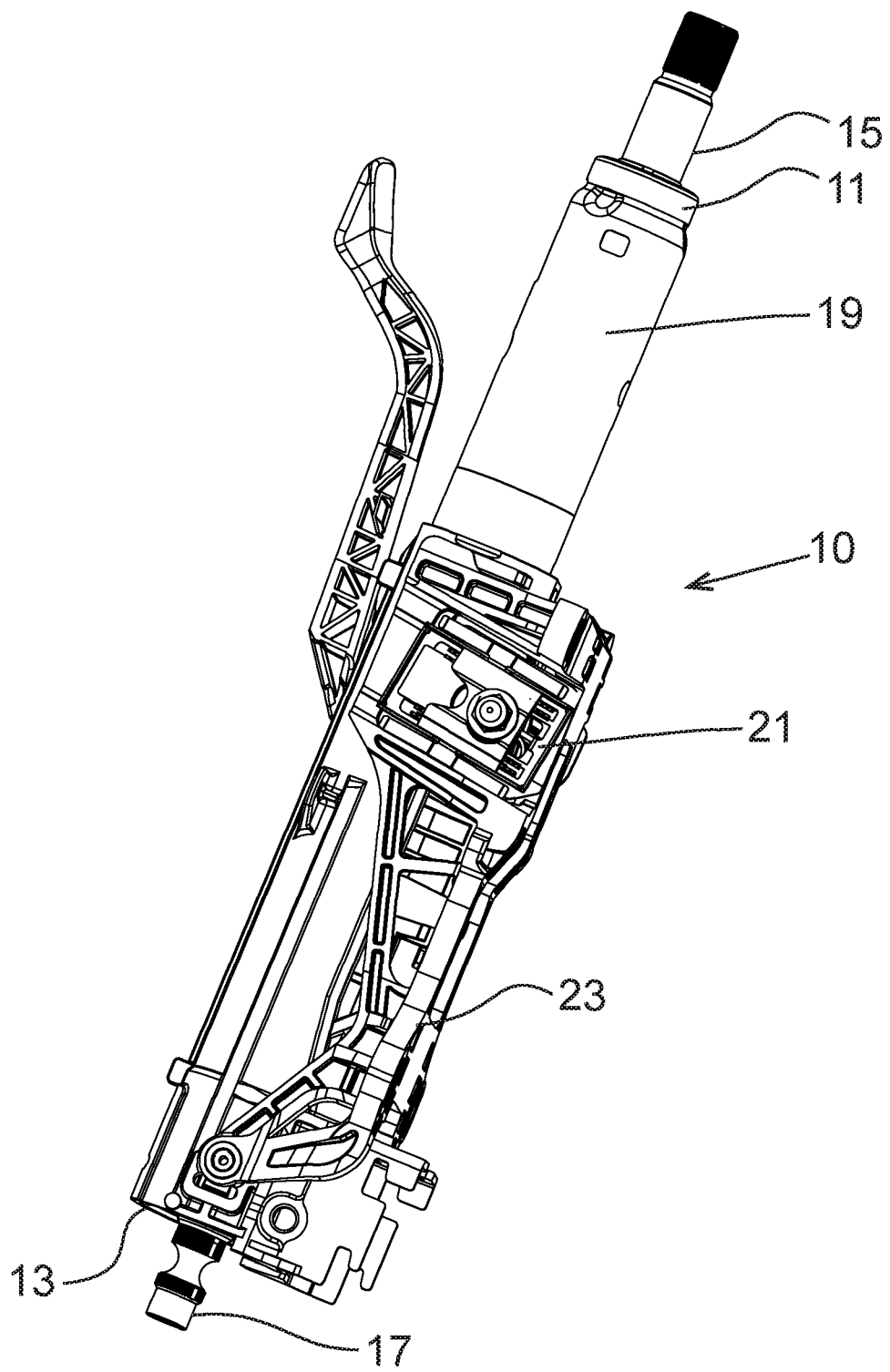
FIG. 1 is a side elevational view of the steering column of the present invention.
Figure 2:
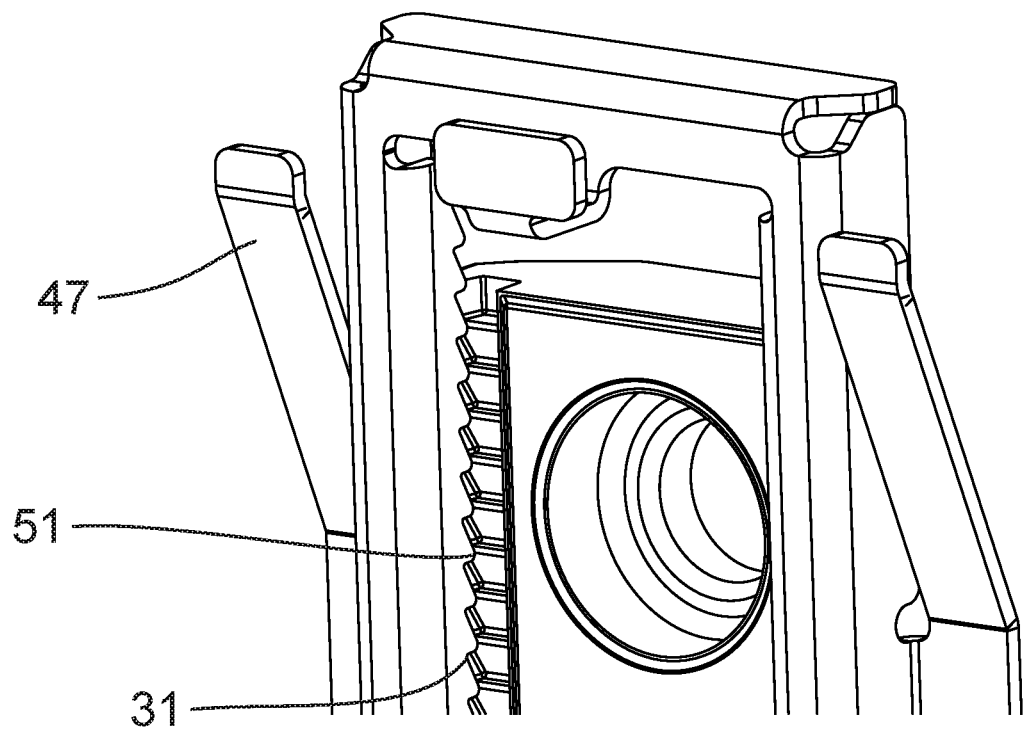
FIG. 2 is a partial perspective view of the lock mechanism.
Figure 3:
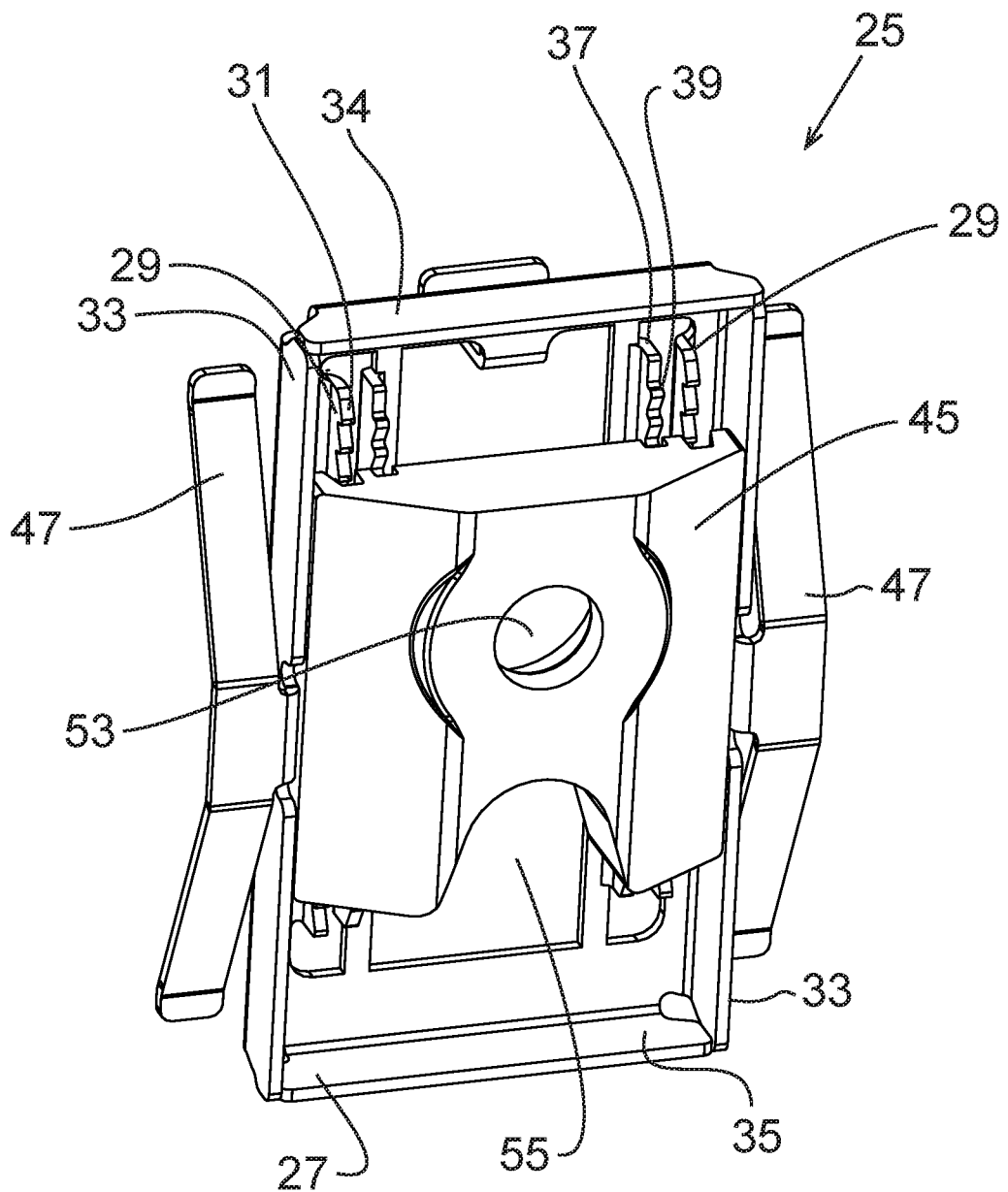
FIG. 3 is a perspective view of the locking mechanism.
Figure 4:
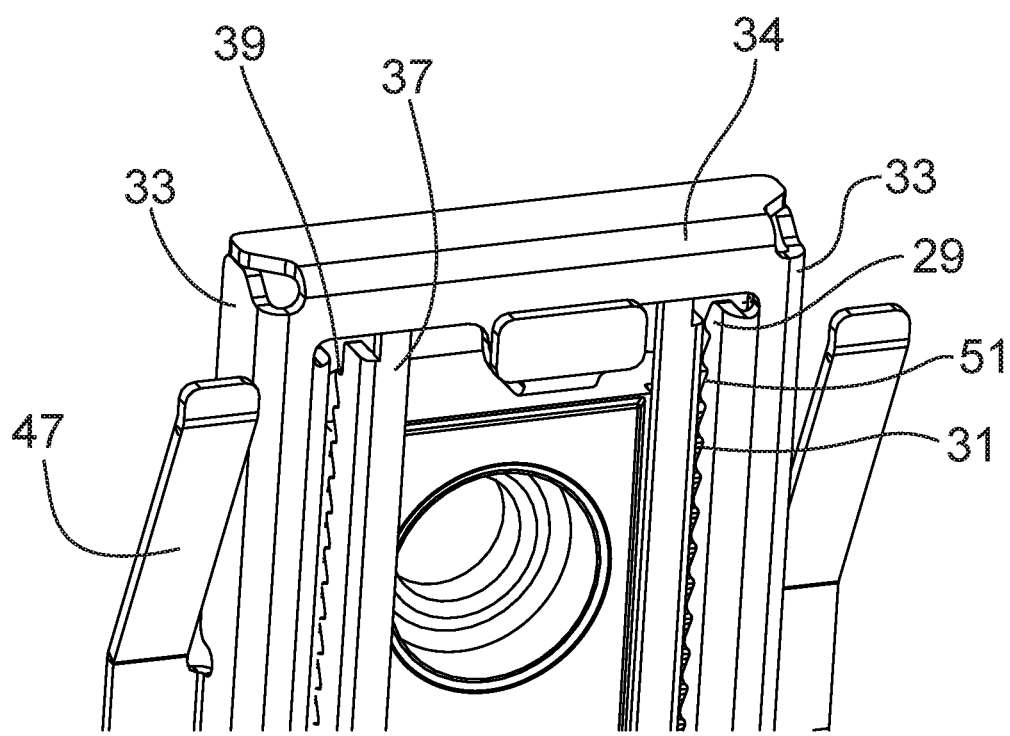
FIG. 4 is a partial perspective view of the lock mechanism of FIG. 3.

The invention relates to an adjustable steering column that is utilized in vehicles. More particularly, the invention is directed to a locking mechanism that controls the tilt feature associated with the adjustable steering column. The features of the invention will be more readily understood by referring to the attached drawings in connection with the following description.

As shown in FIGS. 1-4, there is a steering column 10 that has a tilt adjusting mechanism that allows the steering column to accommodate various driving positions and sizes of drivers for the vehicle. The steering column has a first end 11 and a second end 13. An input shaft 15 extends from the first end 11 of the steering column and an output shaft 17 extends from the second end 13 of a steering column. The input shaft 15 is operatively connected to the steering wheel in the vehicle to allow the driver of the vehicle to control the direction in which the vehicle is steered. The input shaft 15 is positioned in housing 19 and the output shaft 17 is positioned in enclosure 23. The enclosure 23 is secured to the vehicle in a manner known in the art. The housing 19 is pivotably secured to the enclosure 23 in a way that allows the input shaft to move in a pivoting direction with respect to the enclosure. The output shaft 17 is operatively connected to the steering gear mechanism which controls the steered wheels for the vehicle. The input shaft 15 is operatively connected to the output shaft 19 as part of the steering column 10. The basic function of a steering column in controlling the position of a vehicle is well understood in the art and additional details will not be provided on this well-known mechanism.

The adjustment device 21 for the steering column 10 controls the tilt movement for the steering column. The tilt movement is generally used to accommodate an upward and downward movement for the steering wheel of the vehicle. The input shaft 15 is pivotably connected to the output shaft 17 in the area of the adjustment device 21. The input shaft 15 is connected to the output shaft 17 in a way that allows angular movement of the input shaft with respect to the output shaft. It is the angular movement of the input shaft 15 that allows the steering wheel to be adjusted in a tilt or up and down direction by the operator of the vehicle.

A lock mechanism 25 is utilized to control the tilt movement of the output shaft 15 and to secure the output shaft in a desired position once the desired tilt adjustment has been made for the steering wheel of the vehicle. The lock mechanism has a frame 27 that is secured to the enclosure 23 in the area where the input shaft 15 joins the output shaft 17. The frame has side rails 33, a top rail 34 and a bottom rail 35. A first member 29 is positioned on each side of the frame 27 and the first members are disposed in spaced apart parallel relationship. A plurality of teeth 31 are disposed on each of the first members 29. The teeth 31 are disposed in a first direction. A second member 37 is positioned on each side of the frame 27 with a second member adjacent to each first member 29. The second members 37 are positioned in spaced apart parallel relationship with the first member 29. The second members have a plurality of teeth 39 and the teeth are disposed in a second direction. The teeth 31 and the teeth 39 are disposed in a relationship that are 180° apart.

That is the teeth 31 are disposed to engage in a direction that is 180° different from the direction of engagement for the teeth 39.

Figure 5:
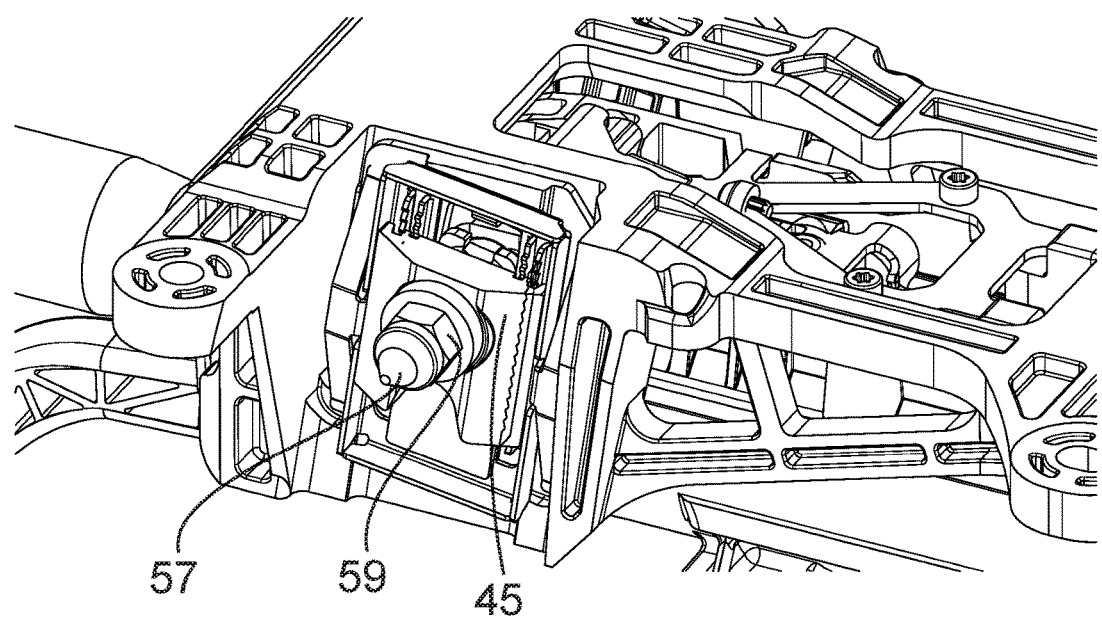
FIG. 5 is a partial perspective view of the lock mechanism.

A moveable lock 45 is connected to the housing 19 and is moveably positioned with respect to the frame 27. As shown in FIG. 5 the moveable lock 45 is mounted on a rod 57. The rod passes through an opening 53 in the moveable lock. The moveable lock is secured to the rod with a nut 59. A lever arm 47 is attached to each side of the moveable lock. The lever arms 47 are also attached to the housing 19. The lever arms 47 are designed to be pivoted with respect to the side rails 33 and the pivoting motion of the lever arms will result in movement of the moveable lock towards and away from the frame 27. The lever arms 47 are operatively connected to the rod 57. Movement of the lever arms cause the rod to be moved in a direction perpendicular to the first and second members on the frame 27. This movement of the rod 57 causes the moveable lock to move towards and away from the frame 27. The moveable lock has at least two channels 49 and the channels are disposed to be in alignment with one of the first and second members on the frame 27. A channel 49 is disposed so that it is in alignment with the first member and the other channel 49 is in alignment with second member. A plurality of recesses 51 are positioned in the channels 49. The recesses are designed to engage the teeth that are on the first and second members that are in alignment with the channels 49. Although the steering column has been described with a first and second member and two channels, it should be understood that one or more member and channels can be used. The lever arms 47 on each side of the frame 27 are configured to move the moveable lock 45 in a manner where the recesses 51 engage the teeth 31, 39 and also where the recesses are not in engagement with the teeth. The recesses 51 that are in alignment with the first members will have an orientation that engages the teeth 31 on the first members and the recesses 51 that are in alignment with the teeth 39 on the second members 37 will have an orientation that engages the teeth 39. The alignment of the teeth 31 on the first members 29 is designed to prevent movement in an upward direction when the moveable lock 45 is positioned where the recesses 51 engage the teeth 31. The teeth 39 on the second members 37 are oriented in a direction to prevent movement in a downward direction when the recesses 51 on the moveable lock 45 are in engagement with the teeth 39. The moveable lock 45 has arcuate cutout 55 that is positioned to extend over the input shaft 15 of the steering column 10. The arcuate cutout 55 provides space to allow the moveable lock to be positioned in different orientations with regard to the input shaft 15.

In operation, the steering column 10 can be adjusted in a tilt direction by moving the lever arm 47 in a direction that causes the moveable lock 45 to disengage from the teeth 31 on the first member and the teeth 39 on the second member. When the moveable lock is disengaged from the first and second members the input shaft 15 contained in the housing 19 and attached to the lock 45 is free to move in a tilt direction. If it is desired to raise the steering wheel it is moved in an upward direction and if it is desired to lower the steering wheel it can be moved in a downward direction. This motion for the steering wheel will cause the input shaft 15 to move in the same direction. Once the desired location for the steering wheel is established the levers 47 are moved in a direction that causes the moveable lock 45 to come into engagement with the first and second members. In this orientation the recesses 51 on the channels 49 of the moveable lock will engage the teeth 31 on the first member and the teeth 39 on the second member and prevent any further movement of the frame 27. The teeth 31 on the first members 29 are designed to prevent movement in an upward direction and the teeth 39 on the second members 37 are designed to prevent movement in a downward direction for the housing 19 that contains the input shaft 15. The structure of the teeth on the first and second members provide additional security to prevent unwanted movement of the steering wheel when the moveable lock 45 engaged with the first and second members on the frame 27.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

The invention claimed is:

1. A lock for an adjustable steering column comprising:
a first member having at least one tooth disposed in a first engaging direction on the first member;
a second member having at least one tooth disposed in a second engaging direction on the second member, wherein the at least one tooth disposed on the first member and the at least one tooth disposed on the second member extend from the first and the second member in a same direction, and wherein the second engaging direction is opposite the first engaging direction;
a moveable locking device having a first recess disposed to engage the at least one tooth on the first member and a second recess to engage the at least one tooth on the second member; and
a releasable clamping device to move the moveable locking device into and away from an engagement position with the first and second members, the first recess restricting movement in the first engaging direction and the second recess restricting movement in the second engaging direction when the moveable locking device is engaged with the first and second members;
wherein more than one first and second members are provided, the moveable locking device having more than one first and second recesses to engage the more than one first and second members.

2. The lock of claim 1 where the first and second members are positioned on a frame that is secured to the steering column.

3. The lock of claim 1 wherein the moveable locking device is moveably positioned on a rod.

4. The lock of claim 3 wherein the releasable clamping device is operatively connected to the rod, the releasable clamping device acting on the rod to move the locking device into and away from the engagement position with the first and second members.

5. The lock on claim 1 wherein the first and second members have a plurality of teeth.

6. The lock of claim 1 wherein the locking device has a plurality of first and second recesses for engaging the teeth on the plurality of first and second members.

* * * * *